(12) United States Patent
Cui et al.

(10) Patent No.: US 11,795,075 B1
(45) Date of Patent: Oct. 24, 2023

(54) VACUUM-FLOCCULATION-SOLIDIFICATION INTEGRATED APPARATUS FOR WASTE MUD AND USING METHOD THEREOF

(71) Applicant: Hangzhou City University, Hangzhou (CN)

(72) Inventors: Yunliang Cui, Hangzhou (CN); Qunchao Ma, Hangzhou (CN); Zhipeng Liu, Hangzhou (CN); Huiming Li, Hangzhou (CN); Chao Chen, Hangzhou (CN); Kai Xu, Hangzhou (CN); Junshuai Zhang, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 0 days.

(21) Appl. No.: 18/336,975

(22) Filed: Jun. 17, 2023

Related U.S. Application Data

(63) Continuation of application No. PCT/CN2023/084023, filed on Mar. 27, 2023.

(30) Foreign Application Priority Data

Sep. 23, 2022 (CN) .......................... 202211161707.1

(51) Int. Cl.
*C02F 1/52* (2023.01)
*C02F 1/56* (2023.01)

(52) U.S. Cl.
CPC .......... *C02F 1/5272* (2013.01); *C02F 1/5209* (2013.01); *C02F 1/56* (2013.01);

(Continued)

(58) Field of Classification Search
None
See application file for complete search history.

(56) References Cited

U.S. PATENT DOCUMENTS 9,944,549 B1 * 4/2018 Rowland ............... C02F 11/123

OTHER PUBLICATIONS

CNIPA, Notification of a First Office Action for CN202211161707. 1, dated Apr. 22, 2023.

(Continued)

*Primary Examiner* — Peter Keyworth
(74) *Attorney, Agent, or Firm* — Zhigang Ma

(57) ABSTRACT

A vacuum-flocculation-solidification integrated apparatus for waste mud and a using method thereof are provided, and the apparatus includes an outer support truss, a vacuum barrel wall, a flocculation stirring device, and a rotary spraying solidification device. The using method of the apparatus includes: flattening a site and installing a support truss and a vacuum barrel wall; assembling a flocculation stirring device and then hoisting and installing to a top of the vacuum barrel wall; checking an air tightness; adding an APAM flocculant, starting the flocculation stirring device and a vacuum pump; starting an air compressor; and squeezing solidified soil from soil outlets. Beneficial effects of apparatus are that: multiple procedures of flocculation, vacuum drainage, solidification and discharging soil for the waste mud are continuously performed; a solidification agent is fully mixed with solidified soil through rotary spraying; and the apparatus is convenient to be disassembled, reassembled, and reused.

9 Claims, 4 Drawing Sheets

(52) U.S. Cl.
CPC .... *C02F 2201/004* (2013.01); *C02F 2209/03* (2013.01); *C02F 2301/063* (2013.01)

(56) References Cited

OTHER PUBLICATIONS

Hangzhou City University (Applicant), Reply to Notification of a First Office Action for CN202211161707.1, w/ (allowed) replacement claims, dated Apr. 23, 2023.
CNIPA, Notification to grant patent right for invention in CN202211161707.1, dated Apr. 28, 2023.

\* cited by examiner

VACUUM-FLOCCULATION-SOLIDIFICATION INTEGRATED APPARATUS FOR WASTE MUD AND USING METHOD THEREOF

TECHNICAL FIELD

The disclosure relates to the technical field of solidification treatment for waste mud, and particularly to a vacuum-flocculation-solidification integrated apparatus for waste mud and a using method thereof.

BACKGROUND

In the process of accelerating urbanization in China, the continuous development of infrastructure projects often produces a large number of engineering waste mud, which has become a difficult problem in urban environmental governance.

At present, waste mud is generally transported to a storage yard or an evaporation pond for treatment, the amount of the waste mud is huge, and the transportation cost is high. Vacuum filtration and centrifugal separation can be used for treatment of the waste mud on the site. Solid-liquid separation is achieved by applying vacuum negative pressure or centrifugal force to the waste mud, but the treatment efficiency is low, and a water content of the treated waste mud is usually still high. In addition, a plate-and-frame filter press method can greatly reduce the water content of the waste mud, but the treatment efficiency is low and the treatment cost is high. Vacuum filtration, centrifugal separation and plate-and-frame filter press are difficult to meet the requirements of a large number of treatments due to limitations of the treatment efficiency and cost.

Vacuum preloading method is suitable for a large number of treatments of waste mud with a high water content, which has been studied by many scholars in China and abroad. However, a permeability coefficient of waste mud after precipitation is small, the drainage and solidification speeds are slow, so that the requirements of rapid dehydration and reduction of waste mud cannot be met. The amount of waste mud on the site is huge and the treatment of waste mud on the site is time-consuming, if the flocculation-precipitation, vacuum drainage, solidification, discharging soil and other processes are performed separately, a lot of time and material resources will be consumed, and the cost is high. Since the amount of waste mud on the site is huge, a one-time addition of a solidification agent cannot fully mix the solidified soil and the solidification agent, the solidifying effect is poor and the strength of the solidified soil is low.

To sum up, an urgent problem to be solved is to ensure that the multiple procedures of flocculation-vacuum-solidification-discharge for the waste mud can be continuously performed, thereby forming an integrated pipelined process, and the multiple procedures are completed in a same apparatus. If the above problem can be solved, the working efficiency of dehydration and solidification for waste mud will be greatly improved, and treatment cost will be greatly reduced, which will bring great social and economic benefits.

SUMMARY

A purpose of the disclosure is to overcome the shortcomings in the prior art, and a vacuum-flocculation-solidification integrated apparatus for waste mud and a using method thereof are provided in the disclosure.

Specifically, a vacuum-flocculation-solidification integrated apparatus for waste mud according to an embodiment of the disclosure includes an outer support truss, a vacuum barrel wall, a flocculation stirring device, and a rotary spraying solidification device.

Moreover, the vacuum barrel wall is externally connected to the outer support truss, a bottom of the outer support truss is fixed through ground anchors, an outer layer of the vacuum barrel wall includes outer aluminum plates, aluminum frames are arranged on an inner side of the outer aluminum plates, a geotextile is sandwiched between two layers of filter screens to together form a filtering structure, and the filtering structure is arranged on the inner side of the outer aluminum plates through the aluminum frames; the vacuum barrel wall includes a first barrel wall, a second barrel wall, a third barrel wall and a fourth barrel wall sequentially arranged in that order from top to bottom; the vacuum barrel wall is provided with a vacuum pump connecting port, and the outer aluminum plates are provided with water outlets; a lower side portion of the fourth barrel wall is provide with soil outlets, and the soil outlets are connected to conveyer belts respectively; a top of the vacuum barrel wall is provided with a mud injecting inlet and a flocculant inlet with respective sealing switches, and a bottom of the fourth barrel wall is a bottom aluminum plate.

Furthermore, a top aluminum plate of the flocculation stirring device is connected to the top of the vacuum barrel wall, an upper surface of the top aluminum plate is connected to a stirring power head through bolts, and a lower surface of the top aluminum plate is connected to a cushion block through bolts; the stirring power head is connected to an end of a stirring rod, the other end of the stirring rod penetrates through the top aluminum plate and the cushion block and extends to the second barrel wall, and the stirring rod is connected to multiple layers of stirring blades through aluminum connectors respectively.

In addition, the third barrel wall is connected to a spiral power head protecting box of the rotary spraying solidification device through an inner support truss, a spiral power head is arranged in the spiral power head protecting box, the spiral power head is connected to a rotary spraying rod, and the rotary spraying rod penetrates through the spiral power head protecting box and extends into the fourth barrel wall; each of the vacuum barrel wall, the spiral power head protecting box, and a surface of the rotary spraying rod is provided with a solidification agent inlet, a gas inlet and a water inlet; multiple pipelines are connected to rotary spraying outlets on the rotary spraying rod through the above inlets (i.e., the solidification agent inlet, the gas inlet and the water inlet); and a spiral blade is disposed on and surrounding the rotary spraying rod.

In an embodiment, the vacuum pump connecting port is connected to a vacuum pump through another pipeline, the solidification agent inlet is connected to a high-pressure solidification agent pump through one of the multiple pipelines, the high-pressure solidification agent pump is connected to a solidification agent container, and a valve is arranged between the high-pressure solidification agent pump and the solidification agent container; the gas inlet is connected to the air compressor through one of the multiple pipelines; the water inlet is connected to a high-pressure water pump through one of the multiple pipelines; the high-pressure water pump is connected to a water tank; and another valve is arranged between the high-pressure water pump and the water tank.

In an embodiment, the multiple layers of stirring blades are arranged in three layers along a vertical direction, each layer of stirring blades is provided with three stirring blades on a horizontal plane, adjacent two stirring blades in the same layer of stirring blades has a horizontal included angle of 120 degrees therebetween, and a vertical spacing among the multiple layers of stirring blades is in a range of 0.3 meters (m) to 0.5 m.

In an embodiment, a vertical spacing among the rotary spraying outlets of the rotary spraying solidification device is in a range of 0.3 m to 0.4 m, and the rotary spraying outlets and the spiral blade are distributed in a staggered manner.

In an embodiment, the fourth barrel wall is in a shape of an inverted frustum of a cone, and an inner diameter of the fourth barrel wall gradually decreases from top to bottom.

According to an embodiment of the disclosure, a using method of the vacuum-flocculation-solidification integrated apparatus for waste mud includes:

S1: flattening a site and then installing the outer support truss and the vacuum barrel wall;

S2: fixing the inner support truss and the spiral power head protecting box in the vacuum barrel wall, installing the rotary spraying solidification device, connecting the solidification agent inlet, the gas inlet and the water inlet to the rotary spraying outlets of the rotary spraying rod respectively, assembling the flocculation stirring device, and hoisting and installing the flocculation stirring device on the top of the vacuum barrel wall;

S3: checking air tightness of the vacuum-flocculation-solidification integrated apparatus for waste mud;

S4: pouring waste mud from the mud injecting inlet until a preset height, adding an anionic polyacrylamide (APAM) flocculant from the flocculant inlet, and starting the flocculation stirring device and the vacuum pump after closing the mud injecting inlet and the flocculant inlet; turning off the flocculation stirring device after fully mixing the waste mud with the APAM flocculant, flocculating and precipitating the waste mud to the rotary spraying solidification device, and discharging wastewater from the water outlets of the outer aluminum plates;

S5: after solidified soil precipitated in the rotary spraying solidification device reaches a certain height, starting an air compressor, supplying wind through the rotary spraying outlets, opening the valve between the high-pressure solidification agent pump the solidification agent container and starting the high-pressure solidification agent pump, starting the rotary spraying solidification device after a solidification agent sprays out from the rotary spraying outlets, and discharging wastewater in the solidified soil from the water outlets; and S6: squeezing out the solidified soil from the soil outlets and discharging the solidified soil to a specified area through the conveyer belts; after completion of squeezing out the solidified soil, opening the another valve (i.e., the valve between the water tank and the high-pressure water pump), starting the high-pressure water pump, and spraying out high-pressure water through the rotary spraying outlets to clean holes and an inner wall of the apparatus (i.e., the vacuum-flocculation-solidification integrated apparatus for waste mud).

In an embodiment, in the S1, the vacuum barrel wall is rigidly connected to the outer support truss; the vacuum barrel wall is connected to the high-pressure solidification agent pump, the air compressor, the high-pressure water pump, and the vacuum pump; and a bottom of the vacuum barrel wall is defined with the soil outlet and installed with the conveyer belts.

In an embodiment, the S3 specifically includes: closing all through holes of the vacuum barrel wall, starting the vacuum pump, and determining the air tightness of the vacuum-flocculation-solidification integrated apparatus for waste mud meets requirements when an inside of the vacuum barrel wall reaches and maintains a negative pressure of more than −85 kilopascals (kPa).

In an embodiment, the geotextile in the vacuum barrel wall is replaced when drainage in the vacuum barrel wall is not smooth (e.g., when drainage in the vacuum barrel wall does not satisfy a predetermined requirement any more).

The disclosure may achieve one or more beneficial effects as follows.

1) In the integrated apparatus for waste mud, multiple procedures of flocculation, vacuum drainage, solidification and discharging soil for the waste mud are continuously performed to form an integrated pipelined process, and the multiple procedures are completed in the same apparatus, so that the treatment efficiency of waste mud is greatly improved, the treatment cost is greatly reduced, and the economic benefit is better.

2) Through the rotary spraying technology, the solidified soil is cut by high-pressure gas while dry powder of a solidification agent is sprayed in multiple directions, so that the solidification agent is fully mixed with the solidified soil, and the strength of the solidified soil is greatly improved. The rotary spraying solidification device is provided with the spiral blade, so that the dehydration efficiency of waste mud is accelerated under the squeezing action of the spiral blade and a centrifugal force. A section of the vacuum barrel wall where the rotary spraying solidification device is located is in a shape of an inverted frustum of a cone, and a diameter of the section is continuously decreased from top to bottom, so that the waste mud is squeezed and the drainage rate is accelerated.

3) By using the vacuum pump, the vacuum barrel wall is in a vacuum negative pressure state, and the waste mud is squeezed by the atmospheric pressure and the self-weight of the waste mud, thereby accelerating the dehydration of the waste mud. All around sides of the barrel wall can be drained, the drainage area is large, the dehydration efficiency is further improved, and the requirement of rapid dehydration is met.

4) The integrated apparatus for waste mud has a high assembly degree, and the integrated apparatus for waste mud has a simplified structure and is convenient to be used. The vacuum barrel wall, the flocculation stirring device, and the rotary spraying solidification device are convenient to be disassembled, reassembled, and reused. In addition, the whole of the vacuum barrel wall is basically in a shape of an inverted frustum of a cone.

DESCRIPTION OF REFERENCE NUMERALS

1—stirring power head; 2—top aluminum plate; 3—stirring blade; 4—stirring rod; 5—cushion block; 6—aluminum connecting piece; 7—bolt; 8—outer aluminum plate; 9—aluminum frame; 10—geotextile; 11—filter screen; 12—flocculation stirring device; 13—outer support truss; 14—inner support truss; 15—rotary spraying solidification device; 16—vacuum barrel wall; 17—conveyer belt; 18—pipeline; 19—solidification agent container; 20—high-pressure solidification agent pump; 21—air compressor; 22—water tank; 23—high-pressure water pump; 24—spiral power head; 25—rotary spraying outlet; 26—spiral blade; 27—rotary spraying rod; 28—spiral power head protecting box; 29—solidification agent inlet; 30—gas inlet; 31—water inlet; 32—vacuum pump; 33—vacuum pump connecting port; 34—ground anchor; 35—a first barrel wall; 36—a second barrel wall; 37—a third barrel wall; 38—fourth barrel wall; 39—mud injecting inlet; 40—valve; 41—soil outlet; 42—flocculant inlet; 43—bottom aluminum plate.

DETAILED DESCRIPTION OF EMBODIMENTS

The disclosure will be further described below with reference to embodiments. The following description of the embodiments is provided only to facilitate the understanding of the disclosure. It should be noted that some modifications may be made to the disclosure by those skilled in the art without departing from the principles of the disclosure, and such improvements and modifications are within the scope of the claims claimed in the disclosure.

Embodiment 1

In the embodiment, as shown in FIG. 1 through FIG. 9, a vacuum-flocculation-solidification integrated apparatus for waste mud includes four parts, i.e., an outer support truss 13, a vacuum barrel wall 16, a flocculation stirring device 12, and a rotary spraying solidification device 15.

Figure 2:
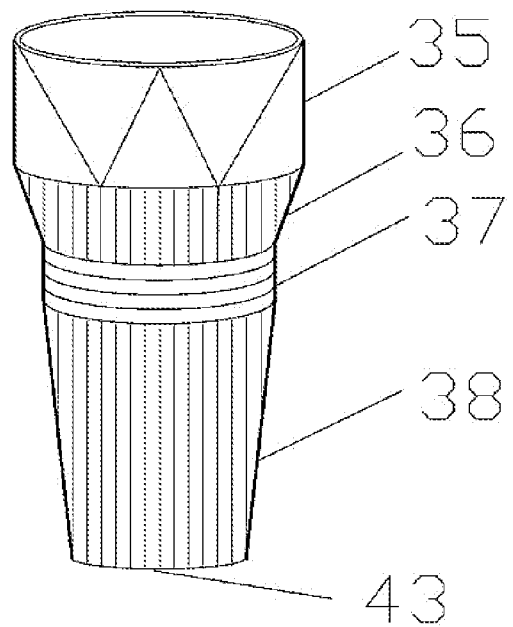
FIG. 2 illustrates a schematic view of a vacuum barrel wall in a shape of an inverted frustum of a cone according to an embodiment of the disclosure.
Figure 6:
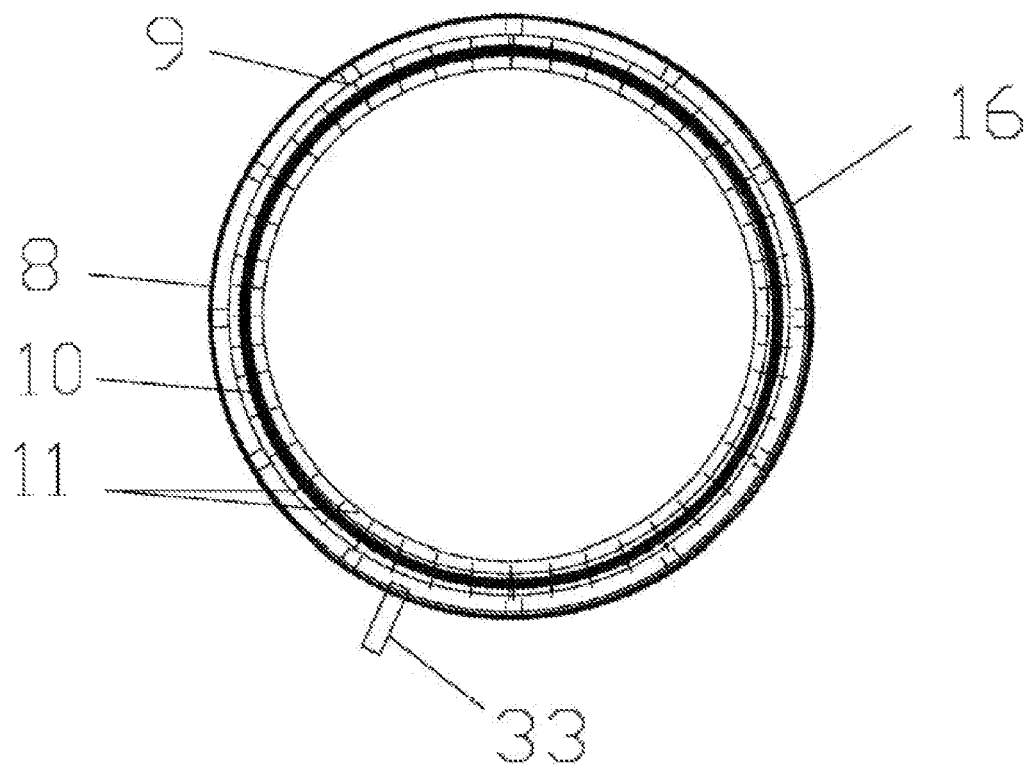
FIG. 6 illustrates a schematic top view of the vacuum barrel wall according to an embodiment of the disclosure.
Figure 7:
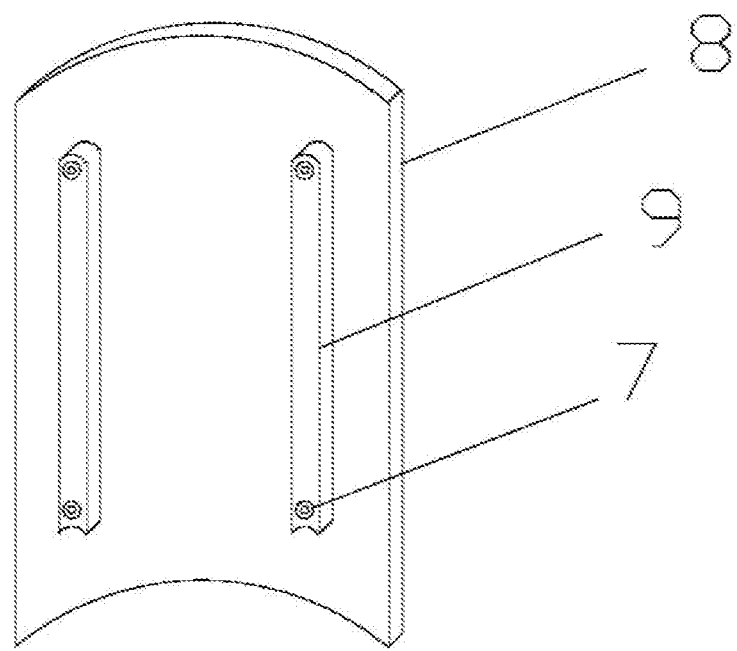
FIG. 7 illustrates a schematic view of an outer aluminum plate being connected with aluminum frames according to an embodiment of the disclosure.

As shown in FIG. 2, FIG. 6, and FIG. 7, The vacuum barrel wall 16 is a sealed cavity with a height of 5 meters (m) and a maximum inner diameter of 2 m. The vacuum barrel wall 16 includes a first barrel wall 35, a second barrel wall 36, a third barrel wall 37 and a fourth barrel wall 38 from top to bottom in sequence. A bottom of the vacuum barrel wall 16 is connected to a bottom aluminum plate 43. The vacuum barrel wall 16 further includes outer aluminum plates 8, aluminum frames 9, filter screens 11, and a geotextile 10. Specifically, the geotextile 10 is sandwiched between two layers of the filter screens 11 to together form a filtering structure. The filtering structure is disposed on the aluminum frames 9 and fixed by bolts 7. The aluminum frames 9 are fixed on the outer aluminum plate 8 by welding.

Figure 1:
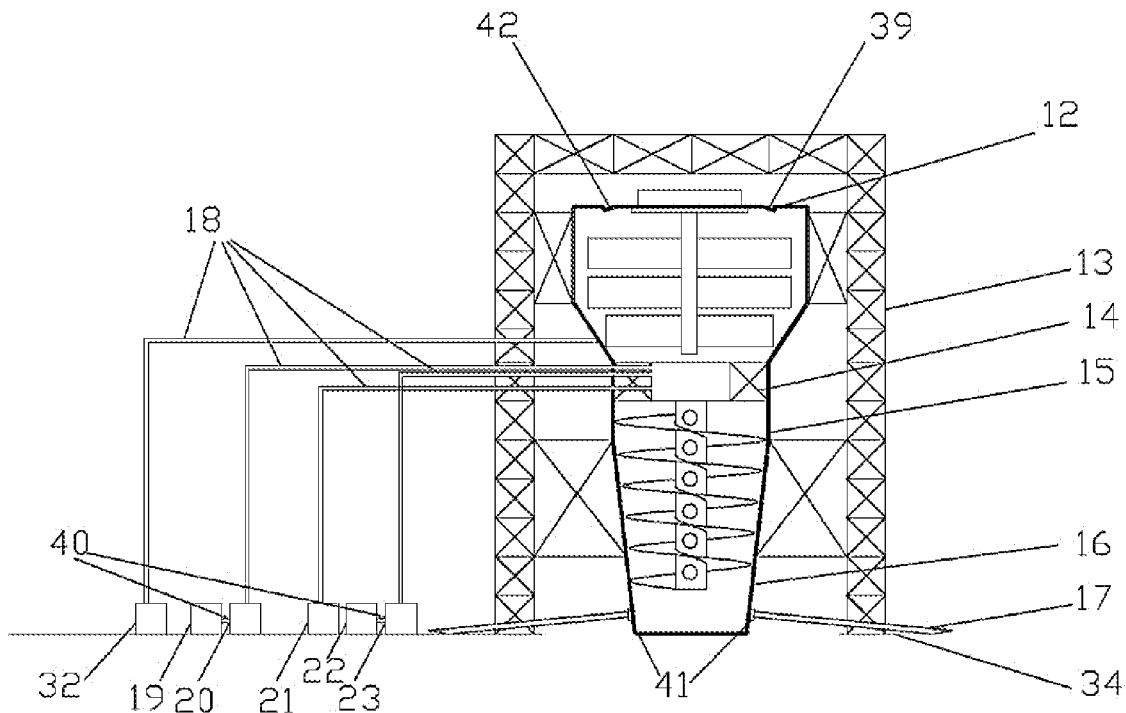
FIG. 1 illustrates a schematic sectional view of a vacuum-flocculation-solidification integrated apparatus for waste mud according to an embodiment of the disclosure.

As shown in FIG. 1, each of the first barrel wall 35 and the third barrel wall 37 is cylindrical, while each of the second barrel wall 36 and the fourth barrel wall 38 is in a shape of an inverted frustum of a cone. The vacuum barrel wall 16 is connected to a vacuum pump 32 through a vacuum pump connecting port 33. The bottom of the vacuum barrel wall 16 is defined with soil outlets 41, and the soil outlets 41 are connected to conveyer belts 17 respectively. The outer aluminum plates 8 are provided with water outlets which are configured for discharging wastewater.

Figure 3:
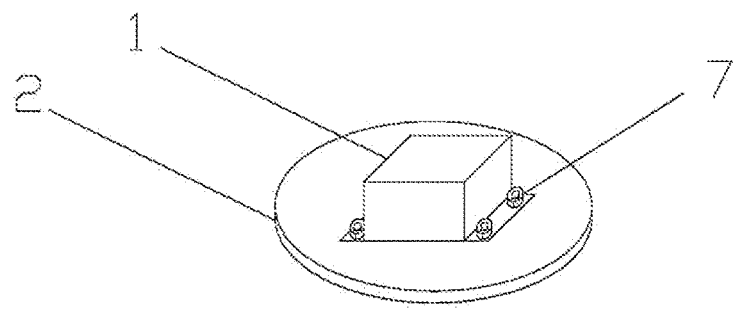
FIG. 3 illustrates a schematic view of a stirring power head of a flocculation stirring device being installed on a top of a top aluminum plate according to an embodiment of the disclosure.
Figure 4:
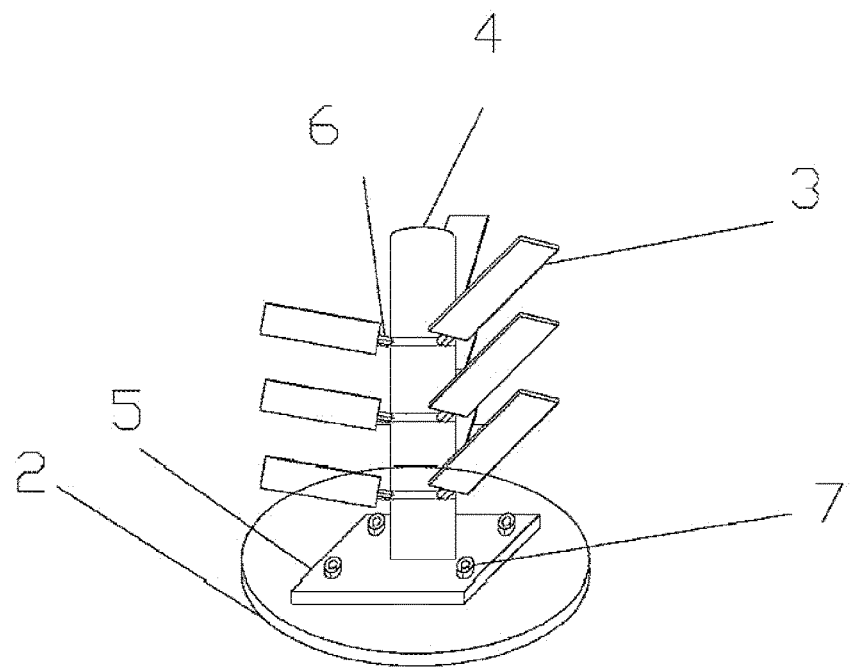
FIG. 4 illustrates a schematic isometric view of main parts of the flocculation stirring device being installed on a bottom of the top aluminum plate according to an embodiment of the disclosure.

As shown in FIG. 3 and FIG. 4, the flocculation stirring device 12 includes a stirring power head 1, the aluminum plate 2, stirring blades 3, and a stirring rod 4. The stirring blades 3 are rigidly fixed to the stirring rod 4 through aluminum connectors 6. The stirring blades 3 are arranged in three layers along a vertical direction, each layer of the stirring blades is provided with three stirring blades 3 on a horizontal plane, adjacent two stirring blades 3 in the same layer of stirring blades 3 has a horizontal included angle of 120 degrees therebetween, and a vertical spacing among the three layers of stirring blades 3 is in a range of 0.3 meters (m) to 0.5 m. The stirring rod 4 is connected to the stirring power head 1 through the cushion block 5 and the top aluminum plate 2 in sequence from bottom to top. And the cushion block 5, the top aluminum plate 2 and the stirring power head 1 are fixed together through bolts 7.

Figure 5:
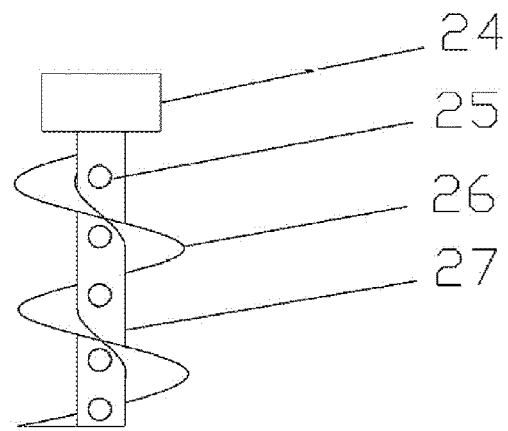
FIG. 5 illustrates a schematic view of main parts of a rotary spraying solidification device according to an embodiment of the disclosure.
Figure 8:
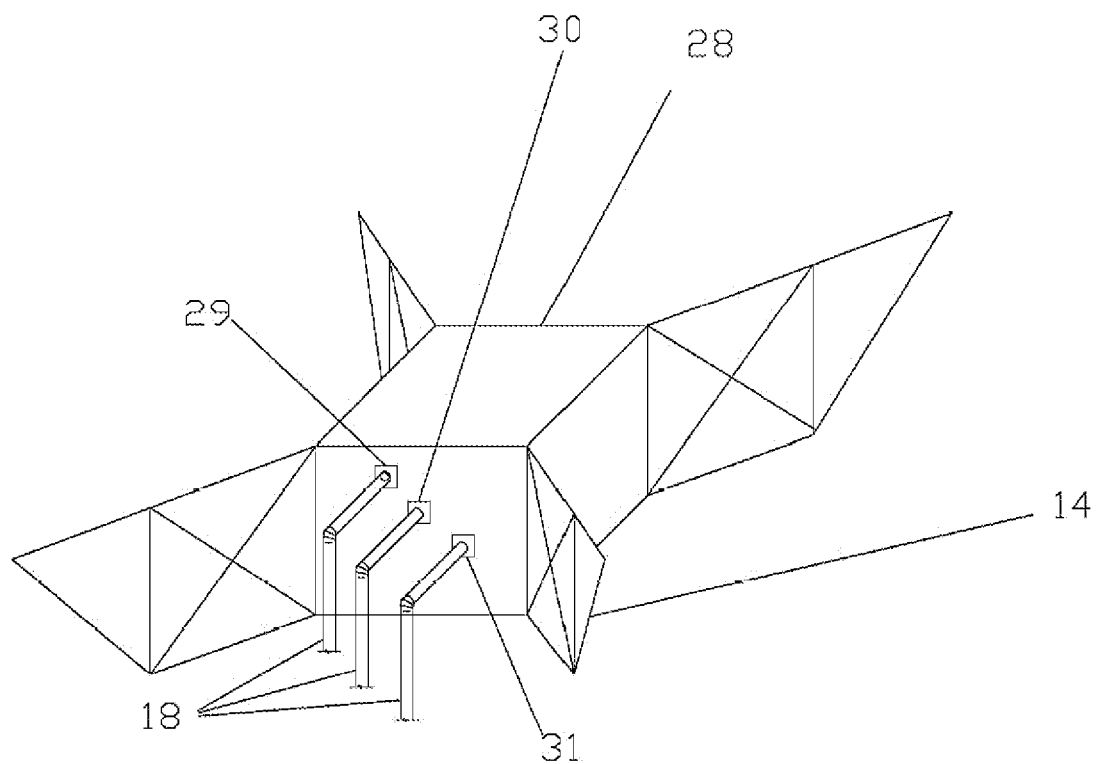
FIG. 8 illustrates a schematic isometric view of an inner support truss being connected with a spiral power head protecting box according to an embodiment of the disclosure.

As shown in FIG. 1, FIG. 5, and FIG. 8, the rotary spraying solidification device 15 includes conveyer belts 17, an inner support truss 14, a solidification agent container 19, a high-pressure solidification agent pump 20, an air compressor 21, a water tank 22, a high-pressure water pump 23, a spiral power head 24, a spiral blade 26, a rotary spraying rod 27, and a spiral power head protecting box 28. The spiral power head protecting box 28 is fixed on the inner support truss 14 by welding, the inner support truss 14 is fixed on the third barrel wall 37 by welding, the spiral power head 24 is fixed in the spiral power head protecting box 28 by the bolts 7, and the rotary spraying rod 27 is connected to the spiral power head 24 by penetrating through the spiral power head protecting box 28. The rotary spraying rod 27 is provided with rotary spraying outlets 25 along a vertical direction. The rotary spraying rod 27 is connected to the high-pressure solidification agent pump 20, the air compressor 21, and the high-pressure water pump 23 through pipelines 18, a solidification agent inlet 29, a gas inlet 30, and a water inlet 31 respectively. Specifically, the high-pressure solidification agent pump 20 is connected to the solidification agent container 19, the high-pressure water pump 23 is connected to the water tank 22 by one of the pipelines 18, and valves 40 are installed on the pipelines 18 (i.e., the pipeline 18 between the high-pressure solidification agent pump 20 and the solidification agent container 19, and the pipeline 18 between the high-pressure water pump 23 and the water tank 22) respectively. Furthermore, the pipelines 18 are connected to the rotary spraying outlets 25 of the rotary spraying rod 27, and the spiral blade 26 is disposed on and surrounding the rotary spraying rod 27. A vertical spacing between each two adjacent rotary spraying outlets 25 in the rotary spraying solidification device 15 is in a range of 0.3 m to 0.4 m, and the rotary spraying outlets 25 and the spiral blade 26 are distributed in a staggered manner.

The flocculation stirring device 12, the inner support truss 14, the rotary spraying solidification device 15 and the vacuum barrel wall 16 are all subjected to anti-corrosion and anti-rust treatment.

Figure 9:
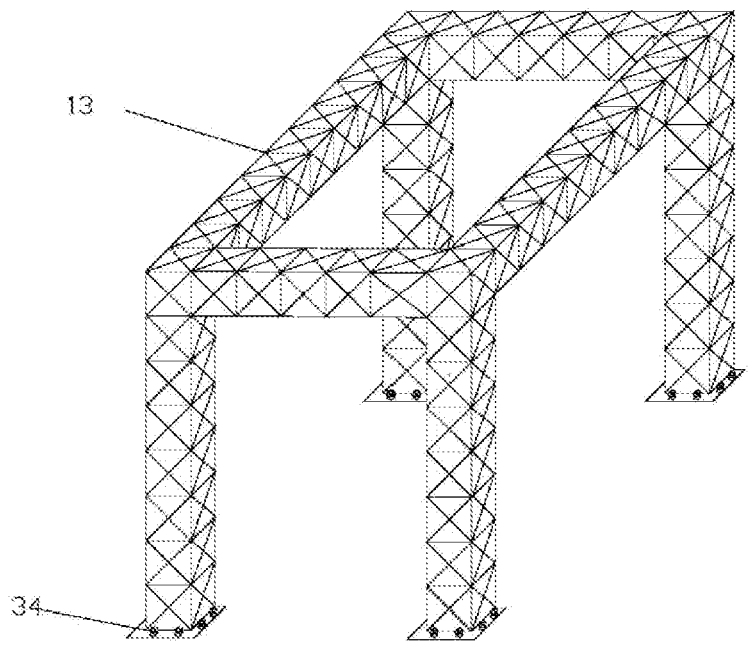
FIG. 9 illustrates a schematic isometric view of an outer support truss according to an embodiment of the disclosure.

As shown in FIG. 1 and FIG. 9, the outer support truss 13 is assembled from aluminum tubes by welding and bolting, and is used to support the vacuum barrel wall 16. The bottom of the outer support truss 13 is fixed by the ground anchors 34.

Embodiment 2

According to Embodiment 1, a using method of the vacuum-flocculation-solidification integrated apparatus for waste mud is provided in this embodiment, the using method specifically includes the following step 1 through step 6.

Step 1: flattening a site, assembling an outer support truss 13, and fixing the outer support truss 13 on the ground through ground anchors 34; connecting prefabricated outer aluminum plates 8 by bolts 7, welding aluminum frames 9 at designated positions of each of the outer aluminum plates 8, disposing a filtering structure on the aluminum frames 9 and the filtering structure formed by combining two layers of filter screens 11 with a single layer of geotextile 10 sandwiched between the two layers of filter screens 11, fixing the filtering structure by bolts 7 to together form a vacuum barrel wall 16, and the vacuum barrel wall 16 being rigidly connected with the outer support truss 13 by welding;

Step 2: defining a solidification agent inlet 29, a gas inlet 30, a water inlet 31 and a vacuum pump connecting port 33 on the vacuum barrel wall 16; connecting the solidification agent inlet 29 to a high-pressure solidification agent pump 20, connecting the high-pressure solidification agent pump 20 to a solidification agent container 19 through one of pipelines 18, and disposing a valve 40 on the pipeline; connecting the gas inlet 30 to an air compressor 21; connecting the water inlet 31 to a high-pressure water pump 23, connecting the high-pressure water pump 23 to a water tank 22 through the pipeline 18 between the high-pressure water pump 23 and the water tank 22, and disposing a valve 40 on the pipeline 18 between the high-pressure water pump 23 and the water tank 22; connecting the vacuum pump connecting port 33 to the vacuum pump 32; defining soil outlets 41 at the bottom of the vacuum barrel wall 16, and installing the conveyer belts 17 outward at the soil outlet 41 by bolts 7; fixing the inner support truss 14 to an inner surface of the vacuum barrel wall 16 by welding, then welding a spiral power head protecting box 28 on the inner support truss 14; hoisting and installing the spiral power head 24 to the inside of the spiral power head protection box 28 by a crane, fixing a rotary spraying rod 27 to a spiral power head 24 by the rotary spraying rod 27 penetrating through a spiral power head protecting box 28, defining rotary spraying outlets 25 on the rotary spraying rod 27 along a vertical direction, a diameter of each of the rotary spraying outlets 25 being 0.1 m, a vertical spacing between each two adjacent rotary spraying outlets 25 being 0.3 m, disposing a prefabricated spiral blades 26 around the rotary spraying rod 27, and the rotary spraying outlets 25 and the spiral blade 26 being distributed in a staggered manner; all component connections in this step being fixed by bolts; assembling the stirring power head 1 with stirring rod 4, installing multiple layers of stirring blades 3 on the stirring rod 4 through aluminum connectors 6 from top to bottom, arranging the multiple layers of stirring blades 3 in three layers along a vertical direction, each layer of stirring blades being provided with three stirring blades 3 on a horizontal plane, adjacent two stirring blades 3 in the same layer of stirring blades 3 has a horizontal included angle of 120 degrees therebetween, and a vertical spacing among the plurality of layers of stirring blades (3) is in a range of 0.3 meters (m) to 0.5 m; then connecting a cushion block 5 and a top aluminum plate 2 to the stirring power head 1, thereby forming a flocculation stirring device 12 finally; hoisting and installing the flocculation stirring device 12 on the top of the vacuum barrel wall 16 by the crane, and connecting the flocculation stirring device 12 to the top of the vacuum barrel wall 16 by the bolts 7; connecting an end of an inner pipeline of the rotary spraying rod 27 to the solidification agent inlet 29, the gas inlet 30, and the water inlet 31; and connecting the other end of the inner pipeline of the rotary spraying rod 27 to the rotary spraying outlets 25;

Step 3: checking air tightness of the vacuum-flocculation-solidification integrated apparatus for waste mud, starting the vacuum pump 32, starting the vacuum pump 32, and determining the air tightness of the vacuum-flocculation-solidification integrated apparatus for waste mud meets requirements when an inside of the vacuum barrel wall 16 reaches and maintains a negative pressure of more than −85 kilopascals (kPa);

Step 4: pouring/injecting waste mud into the vacuum-flocculation-solidification integrated apparatus for waste mud from a mud injecting inlet 39, stop pouring the waste mud until a height of the waste mud reaches a specified height, add an anionic polyacrylamide (APAM) flocculant through a flocculant inlet 42 during pouring the waste mud; closing the mud injecting inlet 39 and the flocculant inlet 42, starting the flocculation stirring device 12 and the vacuum pump 32, the stirring blades 26 stirring in a clockwise direction for fully mixing the waste mud with the APAM flocculant; after 3-5 minutes, turning off the flocculation stirring device 12; after standing for 5-10 min, the waste mud being flocculated and precipitated; under the action of vacuum, squeezing the waste mud for discharging wastewater, and the wastewater being discharged from the water outlets;

Step 5: after the rotary spraying solidification device 15 being fully filled with the solidified soil precipitated in the rotary spraying solidification device 15, starting the air compressor 21 to supply wind through the rotary spraying outlets 25, after the operation of supplying wind being normal, opening the valve 40 of the high-pressure curing agent pump 20 and starting the high-pressure curing agent pump 20, after the curing agent is normally sprayed from the rotary spraying outlet 25, starting the rotary spraying solidification device 15 to fully mix the solidification agent with the solidified soil; in a vacuum state, the solidified soil being squeezed to discharge wastewater under the squeezing actions of the spiral blade 26 and the fourth barrel wall 38, and discharging the wastewater from the water outlets; and Step 6: squeezing out the solidified soil from the soil outlets 41 and discharging the solidified soil to a specified area through the conveyer belts 17; after squeezing out all the solidified soil from the vacuum-flocculation-solidification integrated apparatus for waste mud, opening a valve 40 between the water tank 22 and the high-pressure water pump 23, starting the high-pressure water pump 23, and spraying high-pressure water through the rotary spraying outlets 25 to clean holes and an inner wall of the apparatus (i.e., the vacuum-flocculation-solidification integrated apparatus for waste mud).

When drainage in the vacuum barrel wall 16 is not smooth (e.g., the drainage in the vacuum barrel wall 16 does not meet a predetermined requirement any more), a new geotextile 10 in the vacuum barrel wall 10 may be replaced after unloading the filter screens 11 and the original geotextile 10, and then the new geotextile 10 and the filter screens 11 are fixed by bolts 7.

The step 1 through step 6 are repeated for next treatment of waste mud.

What is claimed is:

1. A vacuum-flocculation-solidification integrated apparatus for waste mud, comprising: an outer support truss (13), a vacuum barrel wall (16), a flocculation stirring device (12), and a rotary spraying solidification device (15);

wherein the vacuum barrel wall (16) is externally connected to the outer support truss (13), a bottom of the outer support truss (13) is fixed through ground anchors (34), an outer layer of the vacuum barrel wall (16) comprises outer aluminum plates (8), aluminum frames (9) are arranged on an inner side of the outer aluminum plates (8), a geotextile (10) is sandwiched between two layers of filter screens (11) to together form a filtering structure, and the filtering structure is arranged on the inner side of the outer aluminum plates (8) through the aluminum frames (9); the vacuum barrel wall (16) comprises a first barrel wall (35), a second barrel wall (36), a third barrel wall (37) and a fourth barrel wall (38) sequentially arranged in that order from top to bottom; the vacuum barrel wall (16) is provided with a vacuum pump connecting port (33), and the outer aluminum plates (8) are provided with water outlets; a lower side portion of the fourth barrel wall (38) is provide with soil outlets (41), and the soil outlets (41) are connected to conveyer belts (17); a top of the vacuum barrel wall (16) is provided with a mud injecting inlet (39) and a flocculant inlet (42) with respective sealing switches, and a bottom of the fourth barrel wall (38) is a bottom aluminum plate (43);

wherein a top aluminum plate (2) of the flocculation stirring device (12) is connected to the top of the vacuum barrel wall (16), an upper surface of the top aluminum plate (2) is connected to a stirring power head (1) through bolts (7), and a lower surface of the top aluminum plate (2) is connected to a cushion block (5) through bolts (7); the stirring power head (1) is connected to an end of a stirring rod (4), the other end of the stirring rod (4) penetrates through the top aluminum plate (2) and the cushion block (5) and extends to the second barrel wall (36), and the stirring rod (4) is connected to a plurality of layers of stirring blades (3) through aluminum connectors (6); and wherein the third barrel wall (37) is connected to a spiral power head protecting box (28) of the rotary spraying solidification device (15) through an inner support truss (14), a spiral power head (24) is arranged in the spiral power head protecting box (28), the spiral power head (24) is connected to a rotary spraying rod (27), and the rotary spraying rod (27) penetrates through the spiral power head protecting box (28) and extends into the fourth barrel wall (38); each of the vacuum barrel wall (16), the spiral power head protecting box (28), and a surface of the rotary spraying rod (27) is provided with a solidification agent inlet (29), a gas inlet (30) and a water inlet (31); a plurality of pipelines (18) are connected to rotary spraying outlets (25) on the rotary spraying rod (27) through the solidification agent inlet (29), the gas inlet (30) and the water inlet (31) respectively; and a spiral blade (26) is disposed on and surrounding the rotary spraying rod (27).

2. The vacuum-flocculation-solidification integrated apparatus for waste mud as claimed in claim 1, wherein the vacuum pump connecting port (33) is connected to a vacuum pump (32) through another pipeline (18), the solidification agent inlet (29) is connected to a high-pressure solidification agent pump (20) through one of the plurality of pipelines (18), the high-pressure solidification agent pump (20) is connected to a solidification agent container (19), and a valve (40) is arranged between the high-pressure solidification agent pump (20) and the solidification agent container (19); the gas inlet (30) is connected to an air compressor (21) through one of the plurality of pipelines (18); the water inlet (31) is connected to a high-pressure water pump (23) through one of the plurality of pipelines (18); the high-pressure water pump (23) is connected to a water tank (22); and another valve (40) is arranged between the high-pressure water pump (23) and the water tank (22).

3. The vacuum-flocculation-solidification integrated apparatus for waste mud as claimed in claim 1, wherein the plurality of layers of stirring blades (3) are arranged in three layers along a vertical direction, each layer of stirring blades (3) is provided with three stirring blades (3) on a horizontal plane, adjacent two stirring blades (3) in the same layer of stirring blades (3) has a horizontal included angle of 120 degrees therebetween, and a vertical spacing among the plurality of layers of stirring blades (3) is in a range of 0.3 meters (in) to 0.5 in.

4. The vacuum-flocculation-solidification integrated apparatus for waste mud as claimed in claim 1, wherein a vertical spacing among the rotary spraying outlets (25) of the rotary spraying solidification device (15) is in a range of 0.3 in to 0.4 in, and the rotary spraying outlets (25) and the spiral blade (26) are distributed in a staggered manner.

5. The vacuum-flocculation-solidification integrated apparatus for waste mud as claimed in claim 1, wherein the fourth barrel wall (38) is in a shape of an inverted frustum of a cone, and an inner diameter of the fourth barrel wall (38) gradually decreases from top to bottom.

6. A using method of the vacuum-flocculation-solidification integrated apparatus for waste mud as claimed in claim 2, comprising:

S1: flattening a site and then installing the outer support truss (13) and the vacuum barrel wall (16);

S2: fixing the inner support truss (14) and the spiral power head protecting box (28) in the vacuum barrel wall (16), installing the rotary spraying solidification device (15), connecting the solidification agent inlet (29), the gas inlet (30) and the water inlet (31) to the rotary spraying outlets (25) of the rotary spraying rod (27) respectively, assembling the flocculation stirring device (12), and hoisting and installing the flocculation stirring device (12) on the top of the vacuum barrel wall (16);

S3: checking air tightness of the vacuum-flocculation-solidification integrated apparatus for waste mud;

S4: pouring waste mud from the mud injecting inlet (39) until a preset height, adding an anionic polyacrylamide (APAM) flocculant from the flocculant inlet (42), and starting the flocculation stirring device (12) and the vacuum pump (32) after closing the mud injecting inlet (39) and the flocculant inlet (42); turning off the flocculation stirring device (12) after fully mixing the waste mud with the APAM flocculant, flocculating and precipitating the waste mud to the rotary spraying solidification device (15), and discharging wastewater from the water outlets of the outer aluminum plates (8);

S5: after solidified soil precipitated in the rotary spraying solidification device (15) reaches a certain height, starting the air compressor (21), supplying wind through the rotary spraying outlets (25), opening the valve (40) between the high-pressure solidification agent pump (20) and the solidification agent container (19) and starting the high-pressure solidification agent pump (20), starting the rotary spraying solidification device (15) after a solidification agent sprays out from the rotary spraying outlets (25), and discharging wastewater in the solidified soil from the water outlets; and S6: squeezing out the solidified soil from the soil outlets (41) and discharging the solidified soil to a specified area through the conveyer belts (17); after completion of squeezing out the solidified soil, opening the another valve (40), starting the high-pressure water pump (23), and spraying out high-pressure water through the rotary spraying outlets (25) to clean holes and an inner wall of the apparatus.

7. The using method of the vacuum-flocculation-solidification integrated apparatus for waste mud as claimed in claim 6, wherein in the S1, the vacuum barrel wall (16) is rigidly connected to the outer support truss (13); the vacuum barrel wall (16) is connected to the high-pressure solidification agent pump (20), the air compressor (21), the high-pressure water pump (23), and the vacuum pump (32); and a bottom of the vacuum barrel wall (16) is defined with the soil outlets (41) and installed with the conveyer belts (17).

8. The using method of the vacuum-flocculation-solidification integrated apparatus for waste mud as claimed in claim 6, wherein the S3 specifically comprises: closing all through holes of the vacuum barrel wall (16), starting the vacuum pump (32), and determining the air tightness of the vacuum-flocculation-solidification integrated apparatus for waste mud meets requirements when an inside of the vacuum barrel wall (16) reaches and maintains a negative pressure of more than −85 kilopascals (kPa).

9. The using method of the vacuum-flocculation-solidification integrated apparatus for waste mud as claimed in claim 6, further comprising: replacing the geotextile (10) of the vacuum barrel wall (16) when drainage in the vacuum barrel wall (16) is not smooth.

* * * * *